(No Model.)   C. B. TRUMBLE.   2 Sheets—Sheet 1.
ANIMAL TRAP.

No. 579,026.   Patented Mar. 16, 1897.

Witnesses
J. F. Coleman
E. A. Ginnel

Inventor
Chauncey B. Trumble
by Wm. N. Ginnel
atty.

(No Model.) 2 Sheets—Sheet 2.

C. B. TRUMBLE.
ANIMAL TRAP.

No. 579,026. Patented Mar. 16, 1897.

Witnesses
Inventor
Chauncey B. Trumble
by Wm. H. Finnell
Atty.

UNITED STATES PATENT OFFICE.

CHAUNCEY BURDETT TRUMBLE, OF GROTON, NEW YORK.

ANIMAL-TRAP.

SPECIFICATION forming part of Letters Patent No. 579,026, dated March 16, 1897.

Application filed June 25, 1896. Serial No. 596,889. (No model.)

*To all whom it may concern:*

Be it known that I, CHAUNCEY BURDETT TRUMBLE, a citizen of the United States, residing at Groton, in the county of Tompkins and State of New York, have invented a certain new and useful Improvement in Animal-Traps, of which the following is a full, clear, and exact description.

The invention relates to traps for catching rats and mice and other vermin or animals and killing them; and the object of the invention is to provide for the catching of the vermin or animal by the neck or adjacent portions of the body and killing them without the necessity of requiring the animal to put its feet on the trap and thus scenting danger by coming in contact with a suspiciously-cold object.

A further object of the invention is to provide for the folding of the trap in order to reduce its bulk for economy of transportation and storage.

In attaining the objects of my invention I provide the lower jaw with a stand or rest, connected therewith in a manner which permits it to be arranged at an angle thereto in order to raise the lower jaw at its rear, and which is capable of being adjusted so as to be substantially alined therewith. This rest or stand is provided with a detent or sear, which is adapted to engage the bait-trigger and the movable jaw to set the trap, and when so set the bait is so hedged in as to prevent the animal from getting the bait from the rear of the trap. By my construction I obtain what may be called a "hair-trigger," that is to say, a trigger that insures a very sensitive set, a feature very desirable in all traps.

Figure 1:
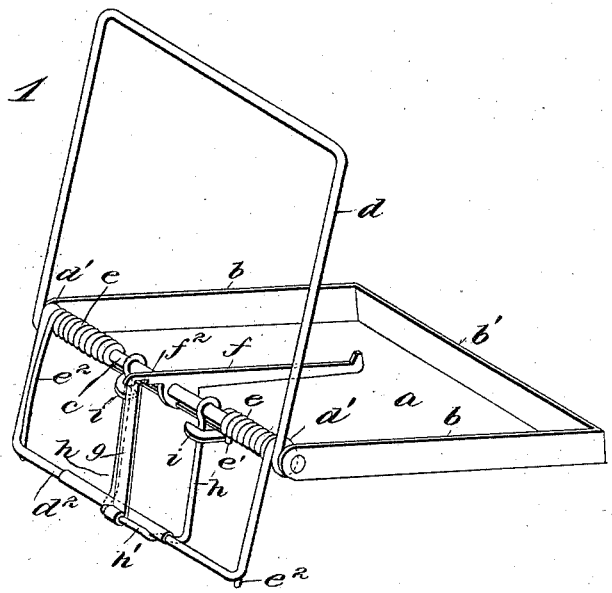
Figure 2:
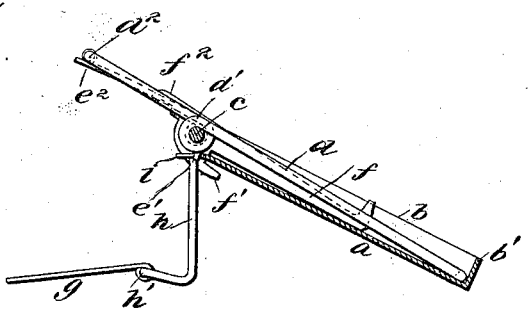
Figure 3:
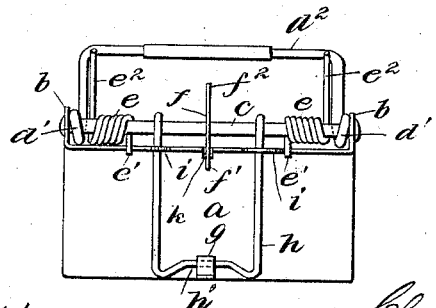
Figure 4:
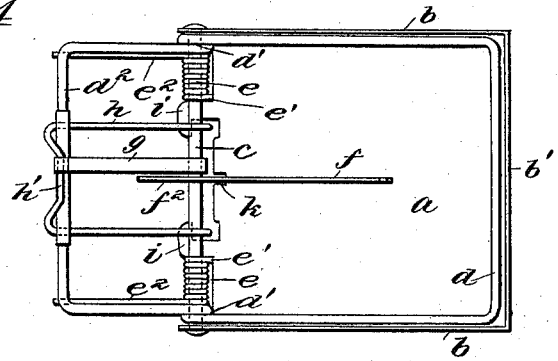
Figure 5:
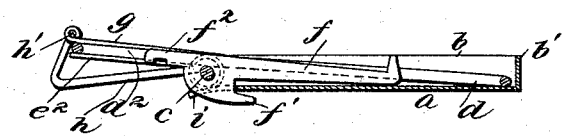
Figure 6:
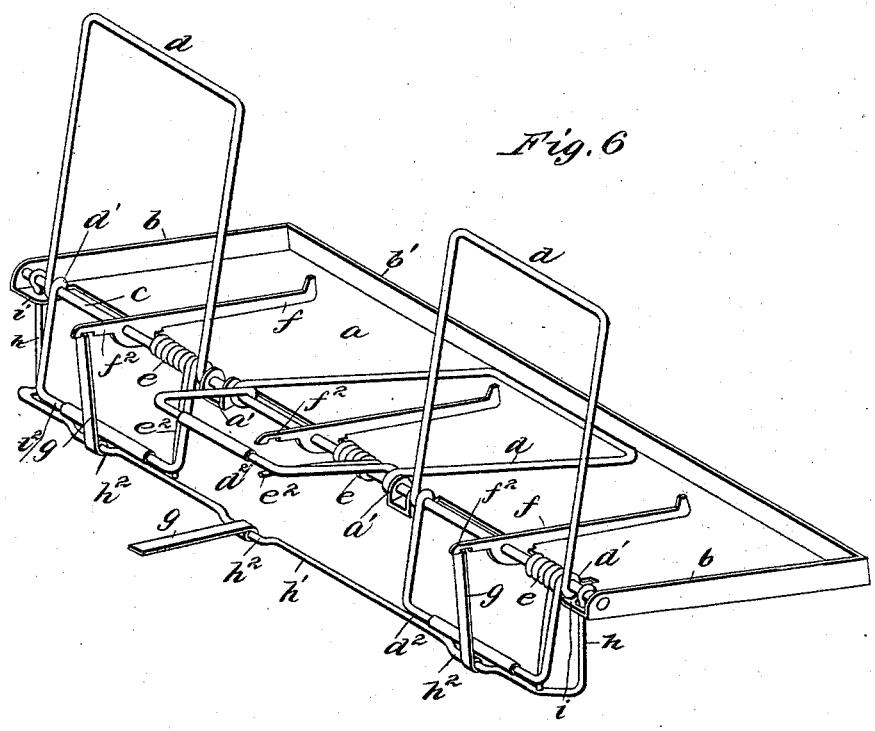

In the accompanying drawings, illustrating my invention, in the several figures of which like parts are similarly designated, Figure 1 is a perspective view of a single trap set. Fig. 2 is longitudinal section, taken in the plane of the near side of the jaws, showing the trap sprung. Fig. 3 is a rear elevation of the trap sprung. Fig. 4 is a top plan view of the trap folded for transportation. Fig. 5 is a longitudinal section of the folded trap, and Fig. 6 is a perspective view of a triple trap.

Referring now more especially to the single trap, Figs. 1 to 5, $a$ is a base or lower jaw, which may be constructed as a metal pan, having the flanged edges $b\ b\ b'$. The flanges $b\ b$ receive and support a bar or spindle $c$, upon which is pivoted the upper jaw $d$. In the example shown this upper jaw is made of wire provided with coils $d'$, which form the bearings for said jaw upon the bar or spindle. Springs $e$ are coiled about the spindle or bar $c$ and made fast thereto by one of their ends $e'$ engaging the lower jaw, while their other ends $e^2$ are extended so as to engage the handle member $d^2$ of the upper jaw in a manner to forcibly propel the said upper jaw toward the base or lower jaw $a$.

$f$ is the bait-trigger, which also is pivoted to the bar or spindle $c$, and is provided with a finger $f'$, which extends below the bottom of the pan and comes into contact therewith when the trigger is set, in order to limit the upper movement of said trigger and to hold it in such position. This trigger has a rearward extension $f^2$, which is notched in order to be engaged by the sear or detent $g$ for setting the trap.

$h$ is a rest or stand, herein shown as a loop of spring-wire having eyes upon the ends of its limbs by means of which the said rest or stand is pivoted to the bar or spindle $c$, and having its closed ends bent out to form a foot $h'$, and upon this foot is pivoted the sear or detent $g$. The base or lower jaw is provided with the hooks $i$, and the limbs of the rest or stand $h$ are adapted to be sprung into and out of these hooks in order respectively to sustain the rest or stand in the upright position shown in Figs. 1, 2, and 3 and to be disengaged therefrom in order to be alined with the base or lower jaw, as shown in Figs. 4 and 5. When the rest or stand is engaged with the hooks, as in Figs. 1, 2, and 3, the lower jaw will be supported at an angle with its rear end elevated, and this is the position of use. When the said rest or stand is disengaged from the hooks, as in Figs. 4 and 5, the trap is in its most compact position for transportation and storage purposes.

When the stand or rest $h$ is engaged with the hooks $i$, the trap may be set by tilting up the upper jaw, so that its handle member $d^2$ shall fall within the foot of the stand or rest, and then the sear or detent $g$ is turned up and its free end engaged with the notch of the extension $f^2$ of the bait-trigger, thereby retaining the upper jaw in the position shown in Fig. 1 until the trap is sprung by the depression of the forward end of the bait-trigger, which motion disengages the end $f^2$ of said trigger from the detent or sear and allows the springs $e$ to act upon the upper jaw and forcibly impel it into the pan or lower jaw. The trigger extends sufficiently near the forward end of the jaws to permit the animal to reach the bait without putting its fore feet into the trap, and thus the upper jaw will descend upon the head or neck of the animal.

The mechanism of my invention may be utilized in a trap having a number of independent upper jaws and a lower jaw common to all. In Fig. 6 I have illustrated this multiplication of these upper jaws in a triple trap. The base $a$ in said trap has not only the bearings for the bar or spindle $c$ in its outside flanges, but it is also made, for purposes of strength, with additional bearings $a'$, so as to provide for limitations of the several upper jaws and for the reception of the springs $e$, which act upon the said upper jaws. The rest or stand $h$ also is common to all of the jaws and differs from the rest or stand of the single-jaw trap only in having, by preference, offset portions $h^2$ in its foot for the reception of the several sears or detents $g$.

In all of the forms of my invention I prefer to use a notch or kerf $k$ in the lower jaw to receive the trigger in order to insure the centering of the trigger and thereby perfect its alinement.

Traps constructed in accordance with the foregoing may be economically manufactured, are strong, very durable, and very efficient. The capacity of folding and the adaptability of adjustment for use are features of great merit in my trap.

Traps embodying my invention may be made in various sizes for use in catching rats, mice, musk-rats, skunks, minks, and other animals and vermin, and may be constructed of metal or of other suitable material.

The operation has already been sufficiently indicated, but it may be said that the trap is set by depressing the upper jaw until its handle member $d^2$ rests within the foot of the stand, and then the detent or sear being turned up into alinement with the notched end of the bait-trigger the said notched end of the bait-trigger is depressed into engagement with the said sear or detent by upward pressure upon the finger $f'$, thus enabling one to set the trap without bringing either hand between the jaws of the trap.

What I claim is—

1. A trap comprising a lower stationary jaw, an upper spring-jaw pivoted thereto, a knockdown or folding rest or stand for the lower jaw, a bait-trigger and a sear or detent, substantially as described.

2. A trap provided with a lower jaw, an upper jaw and means for setting and releasing the upper jaw, and a stand or rest pivoted to the rear of the lower jaw, and capable of being fixed at an angle to the lower jaw so as to support the trap at an inclination, substantially as described.

3. A trap having a lower jaw and a spring upper jaw pivoted thereto, a bait-trigger also pivoted to the lower jaw and engaging a notched portion of said lower jaw, and having a finger $f'$ extending beneath the lower jaw and engaging it to prevent the trigger from flying upwardly unduly, and means for setting the upper jaw and trigger, substantially as described.

4. A trap having a lower jaw and an upper jaw, hooks on the lower jaw, and a knockdown or folding rest or stand having spring-limbs by which it is pivoted to the lower jaw and also by which the said rest or stand may be engaged with the said hooks to support the jaws in position for use, and which may be disengaged from the said hooks so as to enable the trap to be knocked down or folded for purposes of transportation and storage.

5. A trap having a lower jaw, an upper spring-jaw pivoted thereto, a folding or knockdown rest, also pivoted to the lower jaw, and having a foot, a bait-trigger pivoted to the lower jaw, and a detent or sear pivoted to the foot of the stand or rest, substantially as described.

6. A trap having a series of independent upper spring-jaws, a lower jaw common to all of the upper jaws, a series of setting devices for the upper jaws, and a stand or rest common to all of the upper jaws and connected in a folding manner to the lower jaw, substantially as described.

In testimony whereof I have hereunto set my hand this 29th day of April, A. D. 1896.

CHAUNCEY BURDETT TRUMBLE.

Witnesses:
W. D. GALE,
M. A. DOWNING.